June 24, 1941.  A. H. OELKERS  2,246,894
BRAKE HANGER BRACKET
Filed Jan. 19, 1940
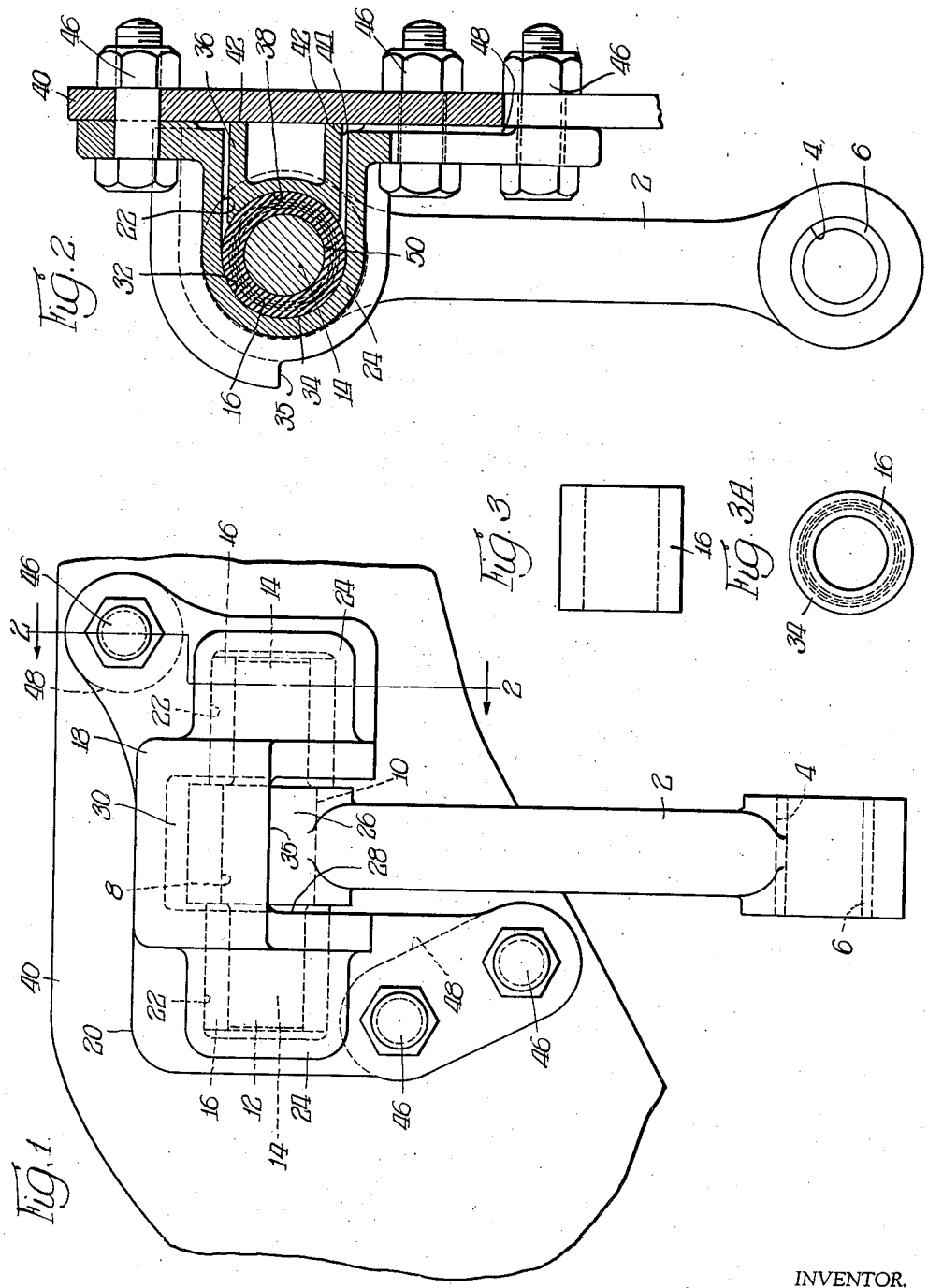
INVENTOR.
Alfred H. Oelkers,
BY
ATTORNEY.

Patented June 24, 1941

2,246,894

UNITED STATES PATENT OFFICE 2,246,894

BRAKE HANGER BRACKET

Alfred H. Oelkers, Chicago, Ill., assignor to American Steel Foundries, Chicago, Ill., a corporation of New Jersey Application January 19, 1940, Serial No. 314,631

12 Claims. (Cl. 188—209)

My invention relates to retaining means for brake hangers and more particularly to a brake hanger suitable for use on passenger car trucks in which bushings of resilient material, such as rubber composition, may be used.

An object of my invention is to design a brake hanger suitable for use on passenger car trucks in which hardened pins and bushings may be eliminated.

My invention further contemplates a simple and economic construction for brake hangers in which bushings of resilient material, such as rubber composition, are provided to eliminate chatter caused by wearing of the parts.

Referring to the drawing,

Figure 1 is a fragmentary side elevation of a truck frame showing my novel invention secured thereto.

Figure 2 is a sectional view taken substantially in the plane indicated by line 2—2 of Figure 1.

Figure 3 is a side elevation of a bushing of rubber composition, and Figure 3A is an end view thereof.

Describing my invention in greater detail, the brake hanger 2 comprises a single member having at its lower end an eye 4 with a bushing 6 fitted therein serving as a pivotal connection for a brake head and brake shoe (not shown) in the usual manner. At the upper end of said hanger may be formed the eye 8 having press-fitted therein the centrally formed shoulder 10 of the suspension pin 12, said pin forming with said hanger a rigid T-shaped head. The opposite ends of said pin 12 form trunnions 14, 14 over which may be sleeved bushings 16, 16 of any suitable resilient material, such as rubber composition.

Said T-head may then be inserted in the housing 18 integrally formed on the brake hanger bracket 20, said trunnions being received in U-shaped pockets or slots 22, 22 provided in the end portions 24, 24 of said housing and the upper end 26 of said hanger being received in a centrally formed opening 28 provided in the lower half of the enlarged central portion 30 of said housing. Within each slot 22 may be formed semi-cylindrical inner surfaces 32, 32 affording a tight and accurate seat for the complementary outer surfaces 34, 34 of the bushings 16, 16. Said opening 28 affords vertical rotation of said hanger on the trunnions 14, 14, said rotation being limited by the shoulder 35.

Filler blocks 36, 36 having arcuate surfaces 38, 38 complementary to the outer surfaces 34, 34 of the bushings 16 are provided for insertion into said slots between said trunnions and the truck frame 40. The outer edges 42, 42 of each block 36 have abutment against said truck frame 40 as at 44 so that as the bolt and nut assemblies 46, 46, which secure said bracket to said frame, are tightened, a squeezing pressure is exerted on said bushings by which they are securely retained. Raised areas 48, 48 on said bracket adjacent the nut and bolt assemblies afford accurate seating of said bracket on said frame.

The pressure placed upon said bushings is not great enough to prevent slippage of said trunnions in the bushings on movement of said hanger, but said pressure may be sufficient to cause some distortion of the resilient material around the inner circumferential portion 50 of said bushings, thus placing said material in shear.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a supported frame member, a brake hanger and bracket structure comprising a housing with a central aperture and U-shaped pockets disposed on opposite sides of said aperture, a hanger supported in said aperture with trunnions accommodated in said pockets, resilient means surrounding said trunnions within said pockets, spaced means securing said bracket structure to said frame member, and means for retaining said hanger in said housing, said retaining means comprising filler blocks inserted between said resilient means and said frame member and having arcuate face engagement with said resilient means and abutment with said frame member intermediate said securing means, said resilient means being placed under such compression as to cause distortion thereof on rotation of said hanger.

2. In a railway car truck, a supported frame member, a brake hanger and bracket structure secured at spaced points to said frame member and comprising a housing with a central opening and transversely disposed slots on opposite sides of said opening, a hanger having an end supported in said opening with trunnions accommodated in said slots, resilient means surrounding said trunnion ends within said slots, means for circumferentially compressing said resilient means and comprising filler blocks received within said slots and having complementary arcuate faces engaging said resilient means and spaced engagement with said frame member, and complementary arcuate surfaces on said housing engaging said resilient means.

3. In a railway car truck, a supported frame member, a brake hanger and bracket structure secured at spaced points to said frame member and comprising a housing with a central aperture and transversely disposed U-shaped pockets, a hanger supported in said aperture with trunnions in said pockets, resilient means surrounding said trunnions within said pockets, means for circumferentially compressing said resilient means and comprising filler blocks interposed between said frame and said resilient means within said pockets and having arcuate surfaces cooperating with arcuate surfaces on said housing to circumferentially compress said resilient means, and a shoulder on said housing to limit vertical rotation of said hanger.

4. In a railway car truck, a supporting frame member, a brake hanger and bracket structure comprising a housing with a central opening and with slots on opposite sides of said opening, a hanger supported in said opening with trunnions in said slots, resilient means surrounding said trunnion ends within said slots, and means for circumferentially compressing said resilient means, said means for compressing said resilient means comprising fillers inserted between said frame member and said resilient means, and complementary arcuate surfaces on said housing and on said fillers engaging said resilient means, each filler having spaced seats against said frame member.

5. In a railway car truck, a supported frame member, a brake hanger and bracket structure secured at spaced points to said frame member and comprising a housing having a central downwardly opening aperture and transverse slots on opposite sides of said aperture, a hanger supported in said aperture with trunnions in said slots, resilient means surrounding said trunnions within said slots, and means for compressing said resilient means comprising filler blocks accommodated within said slots and extending between said frame member and said resilient means, said blocks having complementary arcuate engaging surfaces with said resilient means and being seated against said frame member intermediate said spaced points.

6. In a railway car truck, a supported frame member, a brake hanger and bracket structure comprising a housing with a central aperture and transverse U-shaped pockets on opposite sides of said aperture, a hanger supported in said aperture with trunnions in said pockets, resilient means surrounding said trunnions within said pockets, and means for circumferentially compressing said resilient means comprising filler blocks accommodated in said slots, and complementary arcuate surfaces on said housing and on said blocks engaging said resilient means.

7. In a car truck, a frame member, brake hanger support means comprising a housing with a central slot, a brake hanger supported in said slot with trunnions in said housing, resilient bushings sleeved over said trunnions within said housing, and means for retaining said bushings, said retaining means comprising fillers inserted in said housing between said frame member and said resilient bushings for compressing said resilient bushings and yet permitting relative rotation of said trunnions in said bushings, said fillers having arcuate face engagement with said resilient bushings and spaced abutment with said frame member.

8. In a railway car truck, a supporting frame member, a brake hanger and bracket structure comprising a housing with a central opening and with transverse slots at opposite sides of said opening, a hanger supported in said opening with trunnions in said slots, resilient means surrounding said trunnion ends within said slots, spaced means securing said bracket to said frame member, and means for retaining said resilient means, said retaining means comprising fillers abutting said frame intermediate said securing means and having complementary arcuate surfaces abutting said resilient means.

9. In a car truck, a frame member, brake hanger support means comprising a bracket including a housing with a central slot, a hanger supported in said slot with trunnion ends in said housing, resilient means around said trunnion ends, and means for retaining said resilient means, said retaining means comprising members inserted within said housing in abutment against said frame and said resilient means, and a shoulder on said housing limiting vertical rotation of said hanger.

10. In a car truck, a frame member, brake hanger support means comprising a housing with a central slot, a brake hanger supported in said slot with trunnions in said housing, resilient bushings sleeved over said trunnions within said housing, spaced means securing said bracket to said frame, and means for retaining said bushings, said retaining means comprising fillers having abutment against said frame intermediate said securing means and said resilient bushings.

11. In a railway car truck, a supported frame member, brake hanger support means secured to said member at spaced points, and a brake hanger with trunnions at one end thereof mounted in said means, said means comprising a central housing with an aperture receiving said end of said hanger and having stop means limiting vertical rotation thereof, end housings disposed on opposite sides of said central housing and affording U-shaped pockets for reception of said trunnions, resilient bushings on said trunnions, and blocks in said pockets abutting said resilient means and said frame member intermediate said spaced points, said resilient bushings being compressed between said end housings and said blocks.

12. In a railway car truck, a supported frame member, brake hanger support means secured to said member at spaced points, and a brake hanger with trunnions at one end thereof mounted in said means, said means comprising a central housing with an aperture receiving said end of said hanger and having stop means limiting vertical rotation thereof, end housings disposed on opposite sides of said central housing and affording U-shaped pockets for reception of said trunnions, resilient bushings on said trunnions, and blocks in said pockets abutting said resilient means and said frame member intermediate said spaced points, said resilient bushings being circumferentially compressed an amount to afford distortion of said bushings upon rotation of said hanger.

ALFRED H. OELKERS.